(12) United States Patent
Shinozaki et al.

(10) Patent No.: US 10,347,920 B2
(45) Date of Patent: Jul. 9, 2019

(54) GAS CHANNEL FORMING PLATE FOR FUEL CELL AND FUEL CELL STACK

(71) Applicants: Yoshinori Shinozaki, Kariya (JP); Satoshi Futami, Kariya (JP); Kousuke Kawajiri, Kariya (JP); Keiji Hashimoto, Kariya (JP)

(72) Inventors: Yoshinori Shinozaki, Kariya (JP); Satoshi Futami, Kariya (JP); Kousuke Kawajiri, Kariya (JP); Keiji Hashimoto, Kariya (JP)

(73) Assignee: TOYOTA SHATAI KABUSHIKI KAISHA, Kariya-Shi (JP)

( * ) Notice: Subject to any disclaimer, the term of this patent is extended or adjusted under 35 U.S.C. 154(b) by 29 days.

(21) Appl. No.: 15/489,582

(22) Filed: Apr. 17, 2017

(65) Prior Publication Data

US 2017/0317358 A1    Nov. 2, 2017

(30) Foreign Application Priority Data

Apr. 27, 2016 (JP) ................................. 2016-089252
Feb. 8, 2017 (JP) ................................. 2017-021518

(51) Int. Cl.
*H01M 8/026* (2016.01)
*H01M 8/0254* (2016.01)
(Continued)

(52) U.S. Cl.
CPC ......... *H01M 8/026* (2013.01); *H01M 8/0254* (2013.01); *H01M 8/0265* (2013.01);
(Continued)

(58) Field of Classification Search
CPC ............ H01M 8/026; H01M 8/04156; H01M 8/0265; H01M 8/0254; H01M 8/04291; H01M 2008/1095
See application file for complete search history.

(56) References Cited

U.S. PATENT DOCUMENTS

| 2012/0028139 A1* | 2/2012 | Kawajiri | ............... | H01M 4/926 |
| | | | | 429/414 |
| 2015/0221958 A1 | 8/2015 | Hashimoto et al. | | |
| 2016/0043412 A1 | 2/2016 | Hashimoto et al. | | |

FOREIGN PATENT DOCUMENTS

JP     2014167860 A     9/2014

OTHER PUBLICATIONS

Extended European Search Report dated Jun. 27, 2017 as received in Application No. 17165873.5.

* cited by examiner

*Primary Examiner* — Maria Laios
*Assistant Examiner* — Kwang Han
(74) *Attorney, Agent, or Firm* — Maschoff Brennan

(57) ABSTRACT

A gas channel forming plate is arranged between a membrane electrode assembly and a flat separator base. The gas channel forming plate includes gas channels arranged on a surface that faces the membrane electrode assembly, water channels each formed on the back side of the protrusion between an adjacent pair of the gas channels, communication passages that connect the gas channels and the water channels to each other, and guide portions formed by causing an inner wall surface of a gas channel to protrude inward in the gas channel. The guide portions are formed such that the upstream edge of each communication passage is arranged in a range in which, in the velocity vector of the gas flowing in the gas channel, the directional component directed from the side corresponding to the membrane electrode assembly toward the flat separator base has a positive value.

4 Claims, 6 Drawing Sheets

(51) Int. Cl.
    *H01M 8/04291*    (2016.01)
    *H01M 8/0265*     (2016.01)
    *H01M 8/04119*   (2016.01)
    *H01M 8/1018*     (2016.01)
    *H01M 8/0206*     (2016.01)
    *H01M 8/021*      (2016.01)

(52) U.S. Cl.
    CPC ... *H01M 8/04156* (2013.01); *H01M 8/04291* (2013.01); *H01M 8/021* (2013.01); *H01M 8/0206* (2013.01); *H01M 2008/1095* (2013.01)

GAS CHANNEL FORMING PLATE FOR FUEL CELL AND FUEL CELL STACK

BACKGROUND OF THE INVENTION

The present invention relates to a gas channel forming plate for a fuel cell that is arranged between a membrane electrode assembly and a separator plate, and to a fuel cell stack formed by stacking a plurality of single cells.

For example, a solid polymer electrolyte fuel cell includes a fuel cell stack formed by stacking a plurality of single cells each having a structure in which a membrane electrode assembly is sandwiched between a pair of separators.

One type of such separators includes a flat separator plate and a gas channel forming plate arranged between the flat separator plate and a membrane electrode assembly (for example, Japanese Laid-Open Patent Publication No. 2014-167860).

The gas channel forming plate described in the publication has grooves in the surface that faces the membrane electrode assembly. The grooves are arranged at intervals. The grooves function as gas channels through which gas (fuel gas and oxidant gas) supplied to the interior of the single cell (specifically, the membrane electrode assembly) flows. The gas channel forming plate has protrusions each arranged between adjacent gas channels, and the protrusions form grooves on the back side. These grooves function as water channels for discharging water generated inside the single cell during power generation to the outside of the single cell. Further, each protrusion has through holes (communication passages) for connecting the gas channels and the water channels to each other.

In such a fuel cell stack, water generated during power generation at the membrane electrode assembly flows into the water channels via the communication passages of the gas channel forming plate. The water that has flowed into the water channels is carried away by the dynamic pressure of the gas flowing inside the water channels and is discharged to the outside of the water channels.

The above-described gas channel forming plate has a structure capable of draining water to the water channels only in sections where the communication passages are formed. Therefore, although water generated in the vicinity of the communication passages is promptly discharged to the water channels, water generated at sections distant from the communication passages takes time to be discharged to the water channels.

SUMMARY OF THE INVENTION

Accordingly, it is an objective of the present invention to provide a gas channel forming plate for a fuel cell and a fuel cell stack capable of efficiently draining water into water channels through communication passages.

To achieve the foregoing objective and in accordance with one aspect of the present invention, a gas channel forming plate for a single cell of a fuel cell is provided. The gas channel forming plate is arranged between a membrane electrode assembly and a plate-shaped separator base. The gas channel forming plate includes a plurality of groove-shaped gas channels, a groove-shaped water channel, a plurality of communication passages, and a plurality of guide portions. The groove-shaped gas channels are arranged at intervals on a surface that faces the membrane electrode assembly. The groove-shaped water channel is formed on a back side of a protrusion located between an adjacent pair of the gas channels. The communication passages are arranged at intervals in a direction in which the protrusion extends and connect the gas channels and the water channel to each other. The guide portions are formed by causing an inner wall surface of each gas channel to protrude inward in the gas channel such that a cross-sectional area of the gas channel is partially narrowed. The guide portions are formed such that an edge of each communication passage on an upstream side in a flowing direction of gas flowing in the gas channel is arranged in a range in which, in a velocity vector of the gas, a directional component directed from a side corresponding to the membrane electrode assembly toward the separator base has a positive value.

Downstream edges in the flowing direction of the guide portions and the upstream edges in the flowing direction of the communication passages are preferably located at same positions in the flowing direction.

Each guide portion preferably includes an inclined surface in which a protruding amount of the inner wall surface of the gas channel increases toward a downstream side in the flowing direction.

The gas channel forming plate is preferably a plate of which a cross-sectional shape in a direction perpendicular to the direction in which the gas channels extend has projections and depressions.

The gas channel forming plate for a fuel cell preferably further includes functional units each of which is constituted by two or more of the communication passages and one of the guide portions and functions independently, and the functional units are preferably arranged at intervals.

To achieve the foregoing objective and in accordance with another aspect of the present invention, a fuel cell stack is provided that is formed by stacking a plurality of single cells. Each single cell includes a membrane electrode assembly, a plate-shaped separator base, and the above described gas channel forming plate for a fuel cell. The gas channel forming plate is arranged between the membrane electrode assembly and the separator base.

DETAILED DESCRIPTION OF THE PREFERRED EMBODIMENTS

A gas channel forming plate for a fuel cell and a fuel cell stack according to one embodiment will now be described.

Figure 1:
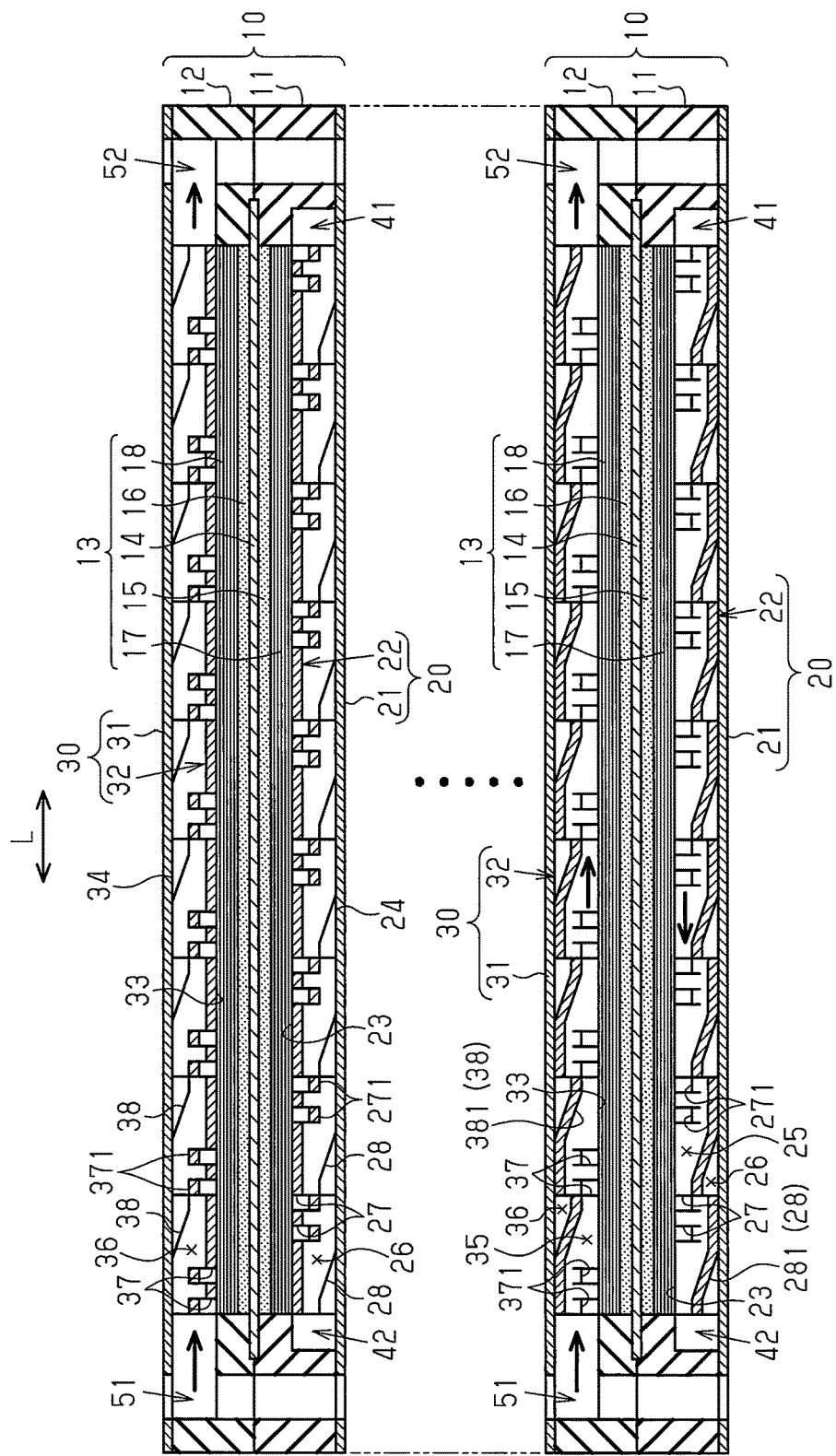
FIG. 1 is a cross-sectional view of gas channel forming plates and a fuel cell stack according to one embodiment.

As shown in FIG. 1, the fuel cell stack of the present embodiment is formed by stacking a plurality of single cells 10, and is incorporated in a solid polymer electrolyte fuel cell. The upper section of FIG. 1 shows a cross-sectional shape of the upper single cell 10, cut at a position where water channels 26, 36, which will be discussed below, are arranged, and the lower section of FIG. 1 shows a cross-sectional shape of the lower single cell 10, cut at a position where gas channels 25, 35, which will be discussed below, are arranged.

Each of the single cells 10 includes a rectangular first frame 11 and a rectangular second frame 12. The frames 11, 12 hold the outer peripheries of a known membrane electrode assembly 13 shaped as a rectangular sheet. The membrane electrode assembly 13 has a multi-layered structure with a solid polymer electrolyte membrane 14, a pair of electrode catalyst layers 15, 16 sandwiching the solid polymer electrolyte membrane 14, and a pair of gas diffusion layers 17, 18 covering the outer surfaces of the electrode catalyst layers 15, 16.

The membrane electrode assembly 13 is sandwiched between a first separator 20 and a second separator 30. The first separator 20 is in contact with the gas diffusion layer 17 on the cathode side (the lower side in FIG. 1) of the membrane electrode assembly 13. In addition, the first separator 20 includes a flat plate-shaped separator base 21 and a gas channel forming plate 22 arranged between the flat separator base 21 and the membrane electrode assembly 13. The second separator 30 is in contact with the gas diffusion layer 18 on the anode side (the upper side in FIG. 1) of the membrane electrode assembly 13. In addition, the second separator 30 includes a flat plate-shaped separator base 31 and a gas channel forming plate 32 arranged between the flat separator base 31 and the membrane electrode assembly 13. The flat separator bases 21, 31 and the gas channel forming plates 22, 32 are each made of a metal plate.

In each single cell 10, the first frame 11 and the flat separator base 21 define a supply passage 41 and a discharge passage 42. The supply passage 41 supplies oxidant gas from an oxidant gas supply source (not shown) to the gas channels 25, which will be discussed below. The discharge passage 42 discharges oxidant gas that has not been used for power generation to the outside of the gas channels 25.

In each single cell 10, the second frame 12 and the separator base 31 define a supply passage 51 and a discharge passage 52. The supply passage 51 supplies fuel gas from a fuel gas supply source (not shown) to the gas channels 35, which will be discussed below. The discharge passage 52 discharges fuel gas that has not been used for power generation to the outside of the gas channels 35.

In the section shown in FIG. 1, the gas channel forming plate 32 of the second separator 30 has a vertically and laterally inverted shape of the gas channel forming plate 22 of the first separator 20. Thus, while the gas channel forming plate 22 of the first separator 20 will be described in detail, reference numerals 3* obtained by adding 10 to the reference numerals 2* of the components of the gas channel forming plate 22 of the first separator 20 are assigned to the corresponding components of the gas channel forming plate 32 of the second separator 30, and redundant explanations are omitted. In addition, redundant explanation is omitted by assigning reference numerals 35*, 37*, and 38*, which are obtained by adding 100 to the reference numerals 25*, 27*, and 28*, to the corresponding components.

The structure of the gas channel forming plate 22 will now be described.

Figure 2:
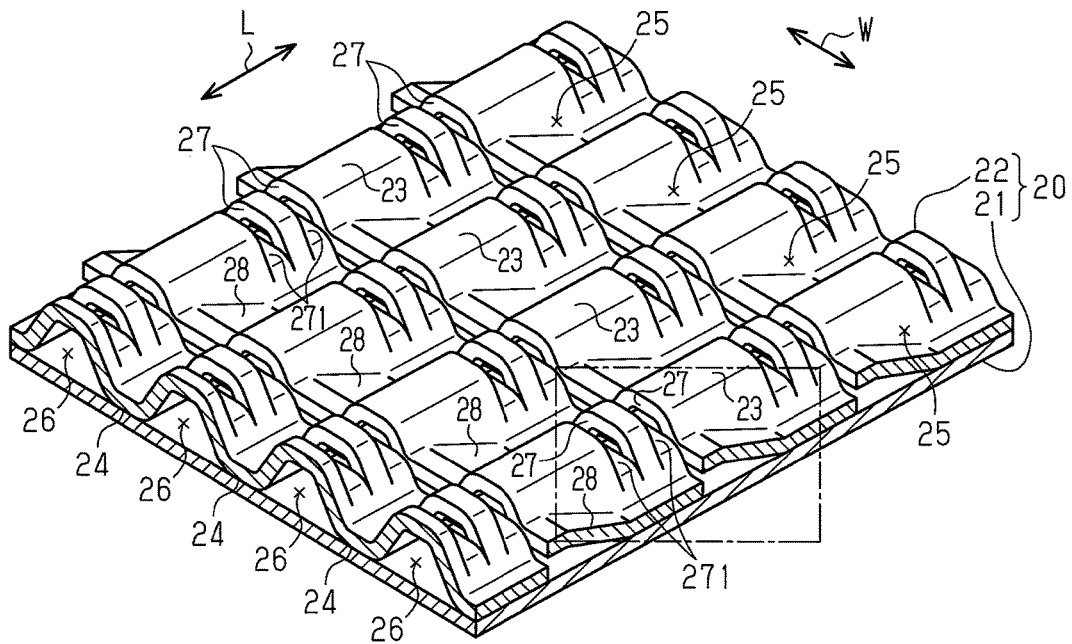
FIG. 2 is a perspective view of a first separator of the embodiment.

As shown in FIG. 2, the gas channel forming plate 22 has a substantially corrugated cross section and is formed by rolling one sheet of a metal plate such as a stainless steel plate.

Inner protrusions 23, which extend parallel to each other, are formed on a surface of the gas channel forming plate 22 that faces the membrane electrode assembly 13 (see FIG. 1) (the upper side as viewed in FIG. 2). The top surfaces of the inner protrusions 23 are in contact with the membrane electrode assembly 13. A groove-shaped gas channel 25 is formed between each adjacent pair of the inner protrusions 23. The gas channels 25 mainly function as channels through which oxidant gas flows.

Outer protrusions 24, which extend parallel to each other, are formed on a surface of the gas channel forming plate 22 that faces the flat separator base 21 (the lower side as viewed in FIG. 2). The top surfaces of the outer protrusions 24 are in contact with the flat separator base 21. A groove-shaped water channel 26 is formed between each adjacent pair of the outer protrusions 24. That is, each water channel 26 is provided on the back side of one of the inner protrusions 23. The water channels 26 mainly function as passages for discharging the water generated during power generation in the membrane electrode assembly 13.

The gas channel forming plate 22 is a corrugated plate that is bent in a direction in which the inner protrusions 23 and the outer protrusions 24 extend (hereinafter, referred to as a width direction W), that is, in a direction orthogonal to a direction in which the gas channels 25 extend (hereinafter, referred to as an extending direction L).

Figure 3:
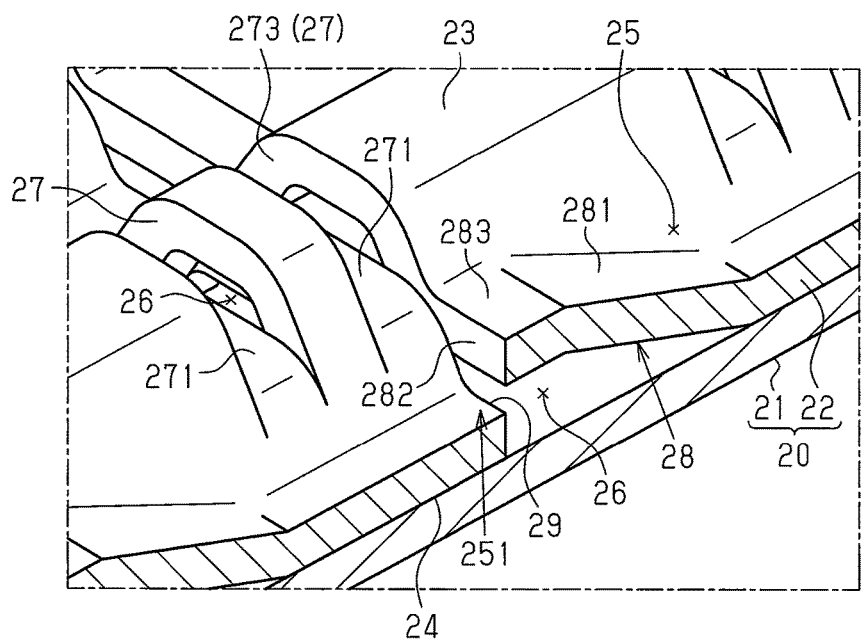
FIG. 3 is a partially enlarged view of FIG. 2.

As shown in FIGS. 2 and 3, each inner protrusion 23 of the gas passage forming plate 22 has a plurality of ribs 271 that extend in the width direction W. More specifically, the gas channel forming plate 22 has a plurality of pairs of ribs 271, and the ribs 271 in each pair are close to each other in the extending direction L. The pairs of the ribs 271 are arranged at equal intervals in the extending direction L. The ribs 271 are formed in the following manner. That is, when a metal plate is rolled in the width direction W to form the gas channel forming plate 22, the top surfaces of the inner protrusions 23 are partially sheared, and the sheared parts are bent away from the top surfaces to form the ribs 271.

Figure 4A:
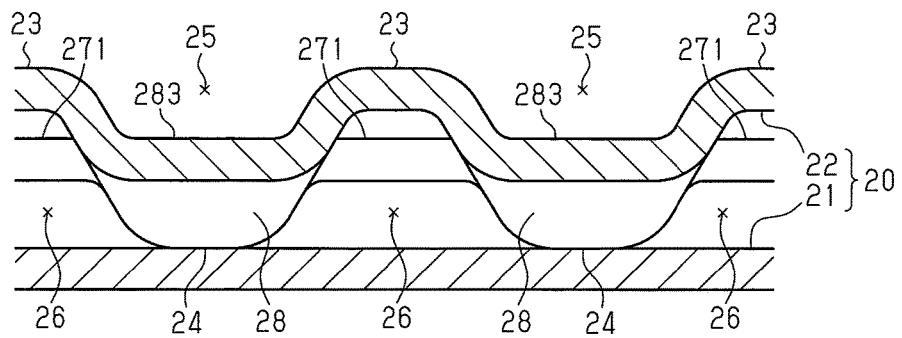
FIG. 4A is a cross-sectional view taken along line 4A-4A in FIG. 5, illustrating the first separator.
Figure 4B:
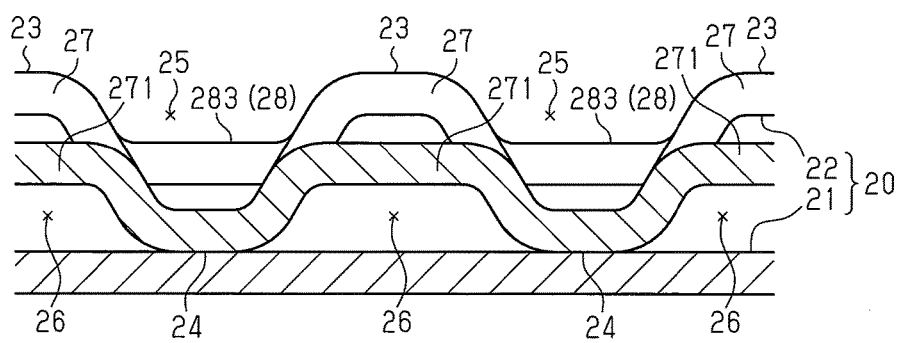
FIG. 4B is a cross-sectional view taken along line 4B-4B in FIG. 5, illustrating the first separator.

FIG. 4A shows a cross-sectional shape of the gas channel forming plate 22 in a section where ribs 271 are not formed. FIG. 4B shows a cross-sectional shape of the gas channel forming plate 22 in a section where ribs 271 are formed.

As shown in FIGS. 4A and 4B, the ribs 271 protrude into the water channels 26. Therefore, the interior of each water channel 26 is obstructed by the ribs 271, so that the pressure loss of oxidant gas in the water channel 26 is increased correspondingly. Also, as shown in FIGS. 2 to 4B, since the ribs 271 are formed on the inner protrusions 23 of the gas channel forming plate 22, a plurality of communication passages 27 are formed in the inner protrusions 23 of the gas channel forming plate 22 to connect the gas channels 25 and the water channels 26 to each other. The shape of the communication passages 27 is determined such that the pressure loss of the oxidant gas in the communication passages 27 is greater than the pressure loss of the oxidant gas in the gas channels 25. In this configuration, oxidant gas mainly flows through the gas channels 25, which have the smaller pressure loss.

As shown in FIGS. 1 to 5, each gas channel 25 has a plurality of guide portions 28 integrated with the gas channel 25. Specifically, the inner wall surface of the gas channel 25 protrudes inward of the gas channel 25 to form the guide portions 28. The guide portions 28 are formed to protrude from the bottom surface of each gas channel 25 toward the top surface of the inner protrusions 23 (upper side in FIG. 5). As shown in FIG. 2, the guide portions 28 are formed to have the same shape. Each guide portion 28 is provided at a position adjacent in the width direction W to a pair of the ribs 271 (communication passages 27) of the corresponding inner protrusion 23. Therefore, the guide portions 28 are also provided at equal intervals in the extending direction L, as in the same manner as the pairs of the communication passages 27.

Figure 5:
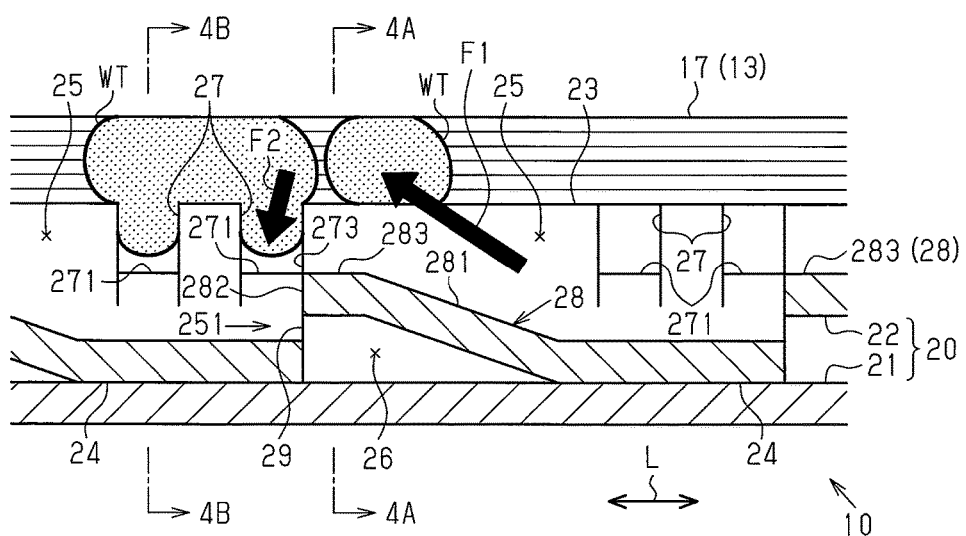
FIG. 5 is a cross-sectional view of guide portions and the surroundings in gas channels.

As shown in FIG. 5, each guide portion 28 has an inclined surface 281, which is inclined such that the protruding amount from the bottom surface of the gas channel 25 increases toward the downstream side in the flowing direction of the oxidant gas flowing through the gas channel 25 (hereinafter, simply referred to as the downstream side). Each guide portion 28 also has a flat surface 283 only in the vicinity of a downstream edge 282. The flat surface 283 is flattened so that the protruding amount from the bottom surface of the gas channel 25 is constant. In this way, in each guide portion 28, the protruding amount from the bottom surface of the gas channel 25 increases toward the downstream side. Also, a communication hole 29 is provided between the downstream edge 282 of each guide portion 28 and the bottom surface of the gas channel 25 to connect the gas channel 25 and the water channel 26 to each other.

The upstream one of each pair of the communication passages 27 has an upstream edge 273 on the upstream side in the flowing direction of oxidant gas (hereinafter, simply referred to as an upstream side). In the present embodiment, the guide portions 28 are arranged such that the downstream edge 282 of the guide portion 28 (the guide portion 28 shown in the center of FIG. 5) and the upstream edge 273 of the upstream one of the corresponding pair of the communication passages 27 (the pair of the communication passages 27 shown on the left side of FIG. 5) are located at the same position in the flowing direction of oxidant gas (the extending direction L). The guide portions 28 are formed in the following manner. That is, when a metal plate is rolled in the width direction W to form the gas channel forming plate 22, the top surfaces of the outer protrusions 24 (the bottom surfaces of the gas channels 25) are partially sheared, and the sheared parts are bent away from the top surfaces to form the guide portions 28. In the present embodiment, each pair of the communication passages 27 and the guide portion 28 adjacent to these communication passages 27 constitute one functional unit that functions independently, and the functional units are arranged on the gas channel forming plate 22 at intervals.

Hereinafter, operation achieved by providing such functional units on the gas channel forming plate 22 will be described.

As shown in the lower single cell 10 in FIG. 1, when fuel gas is supplied into the gas channels 35 through the supply passage 51, the fuel gas flows into the gas diffusion layer 18 through the gas channels 35. Then, the fuel gas passes through the gas diffusion layer 18 and is diffused to be supplied to the electrode catalyst layer 16. On the other hand, when oxidant gas is supplied into the gas channels 25 through the supply passage 41, the oxidant gas flows into the gas diffusion layer 17 through the channels 25. Then, the oxidant gas passes through the gas diffusion layer 17 and is diffused to be supplied to the electrode catalyst layer 15. When the fuel gas and the oxidant gas are supplied to the membrane electrode assembly 13 in this manner, power is generated by electrochemical reaction in the membrane electrode assembly 13.

Upon such power generation in the membrane electrode assembly 13, water is generated inside the cathode-side gas diffusion layer 17 (more specifically, at the interface with the electrode catalyst layer 15 and its vicinity). In order to improve the power generation efficiency of the single cell 10, it is desirable that the water generated inside the gas diffusion layer 17 be promptly discharged to the water channels 26.

In the present embodiment, as shown in FIG. 5, at each section in the single cell 10 where a guide portion 28 is arranged, the cross-sectional area of the gas channel 25 (more specifically, the section sandwiched by the gas channel forming plate 22 and the gas diffusion layer 17) decreases toward the downstream side (the left side in FIG. 5). Therefore, when the oxidant gas passes through each section in the gas channel 25 where a guide portion 28 is arranged, the flow of the oxidant gas comes to include a directional component that is directed from the side corresponding to bottom of the gas channel 25 (the side corresponding to the flat separator base 21) toward the membrane electrode assembly 13 (the upward directional component in FIG. 5), and the flow velocity of the oxidant gas is increased. Some of the flow of the oxidant gas (the flow indicated by the arrow F1 in FIG. 5) flows into the gas diffusion layer 17.

The dynamic pressure of the oxidant gas flowing into the gas diffusion layer 17 carries away water WT inside the gas diffusion layer 17 and collects the water WT around the downstream edge 282 of the guide portion 28, that is, around the communication passages 27. The water WT collected in this manner is drawn into the interior of the communication passages 27 opened on the top surface of the inner protrusion 23, which is in contact with the gas diffusion layer 17, by capillary action.

Further, in the present embodiment, the communication passages 27 of the inner protrusion 23 open at positions adjacent to the downstream edge 282 of the guide portion 28 in each gas channel 25. Thus, the cross-sectional area of the passage portion through which the oxidant gas passes (more specifically, the portion including the gas channel 25 and the communication passages 27) is abruptly increased at the downstream edge 282 of the guide portion 28. Therefore, the oxidant gas that has passed through the section where the guide portion 28 is arranged is diffused in the gas channel 25, so that the flow of the oxidant gas comes to include a directional component in a direction from the side corresponding to the membrane electrode assembly 13 toward the flat separator base 21 (the downward directional component in FIG. 5).

As described above, in the present embodiment, the shapes of the communication passages 27 and the guide portions 28 are determined such that the upstream edge 273 of each pair of the communication passages 27 is located within a range in which the directional component directed from the side corresponding to the membrane electrode assembly 13 toward the flat separator base 21 in the velocity vector of oxidant gas flowing through the gas channel 25 has a positive value. As a result, at least part of the pair of the communication passages 27 is arranged in the section where the flow of oxidant gas includes the directional component from the side corresponding to the membrane electrode assembly 13 toward the flat separator base 21, that is, toward the openings of the communication passages 27 formed in the inner protrusion 23. Therefore, some of the flow of oxidant gas after passing through the section where the guide portion 28 is arranged is directed to the interior of one of the pair of the communication passages 27. Using the gas flow toward the interior of one of the pair of the communication passages 27 (the flow indicated by the arrow F2 in FIG. 5), the water WT collected around the communication passages 27 in the gas diffusion layer 17 is introduced into the interior of one of the pair of the communication passages 27.

Figure 6A:
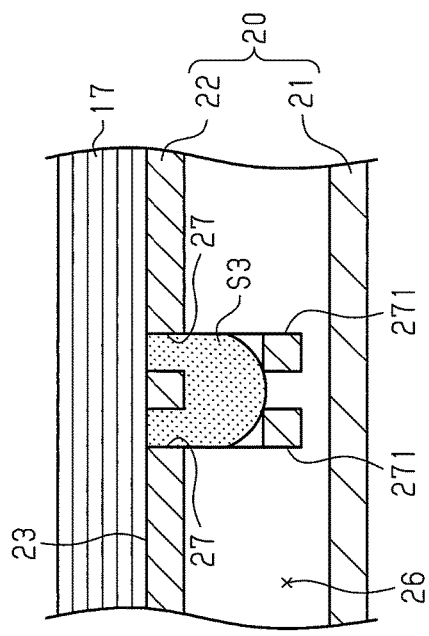
FIG. 6A is an explanatory cross-sectional view of communication passages and the surroundings, illustrating operation of the embodiment.
Figure 6B:
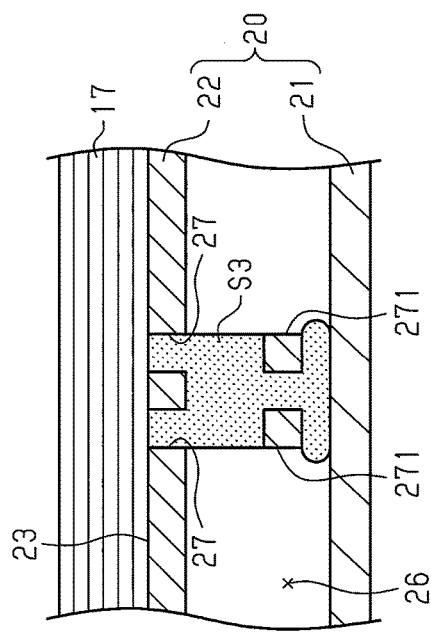
FIG. 6B is an explanatory cross-sectional view of communication passages and the surroundings, illustrating operation of the embodiment.
Figure 6C:
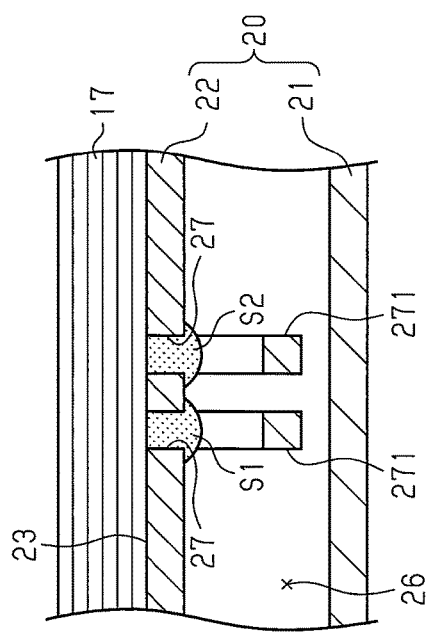
FIG. 6C is an explanatory cross-sectional view of communication passages and the surroundings, illustrating operation of the embodiment.
Figure 6D:
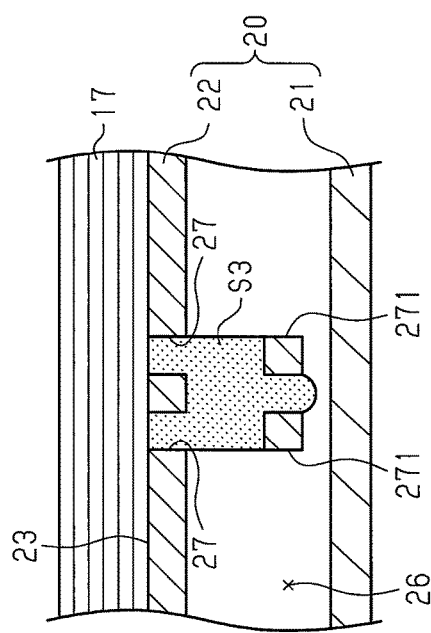
FIG. 6D is an explanatory cross-sectional view of communication passages and the surroundings, illustrating operation of the embodiment.

Then, as shown in FIG. 6A, the water introduced into the pair of the communication passages 27 forms water droplets S1, S2 inside the communication passages 27. Thereafter, when water is additionally introduced into the communication passages 27 and water droplets S1 and S2 grow, the water droplets S1 and S2 combine to form one water droplet S3 as shown in FIG. 6B. In this way, water droplets combine and the combined water droplet S3 grows further, so that the water droplet S3 touches the ribs 271. When the water droplet S3 reaches the gap between the pair of the ribs 271 as shown in FIG. 6C, the water droplet S3 is drawn into the gap by capillary action and introduced into the water channel 26 as shown in FIG. 6D. When the water introduced into the water channel 26 becomes water droplets and is held by the ribs 271, this water serves as priming water to introduce the water in the communication passages 27 into the water channel 26 by capillary action.

As described above, the present embodiment provides the guide portions 28 in the gas channel forming plate 22, thereby utilizing the flow of gas in the gas channel 25 to efficiently drain water to the water channel 26 through the communication passages 27.

The water introduced into the water channel 26 in this manner is carried away to the downstream side by the dynamic pressure of the oxidant gas flowing in the water channel 26 and discharged to the outside of the single cell 10 via the discharge passage 42.

As shown in FIG. 5, the guide portions 28 are provided on the gas channel forming plate 22. Thus, a recessed corner portion 251 is formed at the position adjacent to the downstream edge 282 of each guide portion 28 in the gas channel 25. The corner portion 251 is dented toward the bottom surface of the gas channel 25 (toward the lower side in FIG. 5). Oxidant gas cannot easily flow through the corner portion 251. Thus, when the water WT generated during power generation in the membrane electrode assembly 13 flows into the gas channel 25, the water is likely to stay in the corner portion 251. However, in the present embodiment, the communication hole 29 is formed in the corner portion 251 to connect the gas channel 25 and the water channel 26 to each other. Therefore, the water that has flowed into the gas channel 25 and reached the corner portion 251 is drawn into the communication hole 29 by capillary action and introduced into the water channel 26.

Further, at the time of power generation in the membrane electrode assembly 13, water is also generated at a portion on the anode side within the single cell 10 (for example, inside the gas diffusion layer 18). In the present embodiment, the anode-side gas channel forming plate 32 has the same structure as the cathode-side gas channel forming plate 22. Therefore, the gas channel 35 and the water channel 36 on the anode side also operate in the same manner as the gas channel 25 and the water channel 26 on the cathode side.

As described above, the present embodiment achieves the following operational advantages.

(1) The guide portions 28, 38 on the gas channel forming plates 22, 32 permit water to be efficiently drained to the water channels 26, 36 through the communication passages 27, 37.

(2) The downstream edges 282, 382 of the guide portions 28, 38 and the upstream edges 273, 373 of the upstream ones of the communication passages 27, 37 are arranged at the same position in the extending direction L. This creates no space in the single cell 10 between the downstream edges 282, 382 in the extending direction L of the guide portions 28, 38 and the openings of the communication passages 27, 37. The guide portions 28, 38 and the openings of the communication passages 27, 37 thus do not overlap in the extending direction L. According to this, most of the oxidant gas flow (refer to the arrow F2 in FIG. 5) deflected toward the interior of the communication passages 27, 37 after passing through the sections where the guide portions 28, 38 are arranged is directed toward the openings of the communication passages 27, 37 on the upstream side, and that flow easily flows into the communication passages 27, 37. Therefore, the entire openings of the communication passages 27, 37 are effectively used to introduce surrounding water into the communication passages 27, 37.

(3) The guide portions 28, 38 have the inclined surfaces 281, 381 and the flat surfaces 283, 383, and the inclined surfaces 281, 381 are formed such that the protruding amount increases toward the downstream side. Therefore, gas (oxidant gas or fuel gas) smoothly flows along the inclined surfaces 281, 381 and the flat surfaces 283, 383, respectively. This suppresses increase in the pressure loss of gas due to the addition of the guide portions 28, 38 to the gas channels 25, 35.

(4) Corrugated plates can be used as the gas channel forming plates 22, 32, which have the gas channels 25, 35 and the water channels 26, 36. The grooves on one side of the corrugated plate are used as the gas channels 25, 35, and the grooves on the other side are used as the water channels 26, 36.

(5) Each of the gas channel forming plates 22, 32 has multiple functional units at intervals, and each functional unit is constituted by a pair of communication passages 27, 37 and a single guide portion 28, 38. The functional units are capable of efficiently draining water to the water channels 26, 36 in a wide area in the single cell 10.

(6) The communication holes 29, 39 are formed in the corner portions 251, 351, which are formed at positions adjacent to the downstream edges 282, 382 of the guide portions 28, 38 in the gas channels 25, 35. This allows the water that has flowed into the gas channels 25, 35 and reached the corner portions 251, 351 to be moved to the water channels 26, 36 via the communication holes 29, 39. Therefore, although the corner portions 251, 351 are formed by providing the guide portions 28, 38 in the gas channels 25, 35, water is restrained from staying in the corner portions 251, 351.

(7) The gas channel forming plates 22, 32 are formed by rolling metal plates along the width direction W, which is orthogonal to the extending direction L of the gas channels 25 and 35, respectively. Further, the guide portions 28, 38 are formed at positions adjacent to the corresponding pair of the communication passages 27, 37 of the inner protrusions 23, 33 in the width direction W, respectively. The apparatus used for the rolling includes a pair of rolls (not shown) in which cutting blades are stacked in the axial direction. The cutting blades of the rolls include cutting blades for forming the communication passages 27, 37. In the present embodiment, shapes corresponding to the guide portions 28, 38 are imparted to the cutting blades for forming the communication passages 27, 37. This forms the gas channel forming plates 22, 32 with the communication passages 27, 37. Therefore, it is possible to produce the gas channel forming plates 22, 32 by simply changing the shape of some of the cutting blades constituting the existing roll.

The above described embodiment may be modified as follows.

The gas channel forming plates 22, 32 may be formed of metal plates other than stainless steel plates. For example, titanium plates may be used.

In the guide portions 28, 38, the flat surfaces 283, 383 may be omitted so that only the inclined surfaces 281, 381 are formed.

Figure 7:
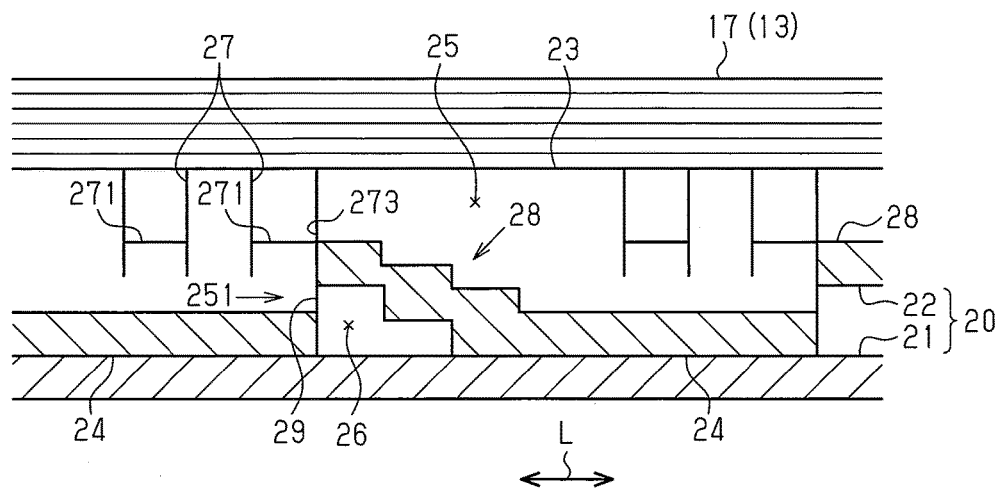
FIG. 7 is a cross-sectional view of guide portions and the surroundings in gas channels according to another embodiment.

As shown in FIG. 7, the guide portions 28, 38 may be shaped like a staircase in which the projecting amount increases toward the downstream side. This configuration also allows the flow of gas passing through the sections of the gas channels 25, 35 where the guide portions 28, 38 are arranged to have a directional component that is directed from the side corresponding to the flat separator base 21 of the gas channel 25 toward the membrane electrode assembly 13. This configuration also increases the flow velocity of the gas.

The guide portions 28, 38 and the communication passages 27, 37 may be arranged such that the upstream edges 273, 373 of the communication passages 27, 37 are located on the upstream side of the downstream edges 282, 382 of the guide portions 28, 38. For example, the section where the guide portions 28, 38 are arranged and the range in which the upstream-side communication passages 27, 37 open may partially overlap.

Figure 8:
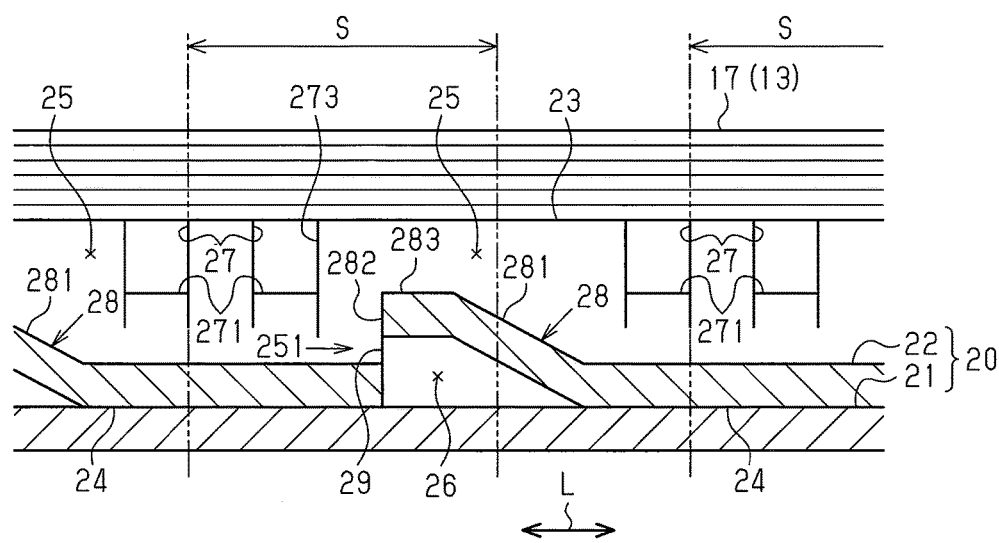
FIG. 8 is a cross-sectional view of guide portions and the surroundings in gas channels according to another embodiment.

The guide portions 28, 38 and the communication passages 27, 37 may be arranged such that the upstream edges 273, 373 of the communication passages 27, 37 are on the downstream side of the downstream edges 282, 382 of the guide portions 28, 38 as shown in FIG. 8. In the example shown in FIG. 8, the upstream edges 273, 373 of the upstream ones of the pair of the communication passages 27, 37 are located closer to the downstream sides than the downstream edges 282, 382 of the guide portions 28, 38 by the amount corresponding to the opening width in the extending direction L of the upstream ones of the pair of the communication passages 27, 37. In the velocity vector of the oxidant gas flowing through the gas channel 25 of the example shown in FIG. 8, the directional component directed from the side corresponding to the membrane electrode assembly 13 toward the flat separator base 21 has a positive value in the ranges indicated by S in FIG. 8, and has a negative value in sections outside the ranges S.

In short, the shapes of the communication passages 27, 37 and the guide portions 28, 38 may be determined such that the upstream edges 273, 373 of the pairs of the communication passages 27, 37 are located within the ranges in which the directional component directed from the side corresponding to the membrane electrode assembly 13 toward the flat separator base 21 in the velocity vector of oxidant gas flowing through the gas channels 25 has a positive value. Even with this configuration, some of the flow of oxidant gas after passing through the sections where the guide portions 28, 38 are arranged is directed to the interior of the communication passages 27, 37. Thus, the water WT collected around the communication passages 27 in the gas diffusion layer 17 is introduced into the interior of the communication passages 27 by utilizing the gas flow toward the interior of the communication passages 27 (the flow indicated by the arrow F2 in FIG. 5).

Instead of forming the guide portions 28, 38 such that the bottom walls of the gas channels 25, 35 protrude inward of the gas channels 25, 35, the guide portions 28, 38 may be formed such that side walls of the gas channels 25, 35 protrude inward of the gas channels 25, 35. Even with this configuration, the cross-sectional area of the gas channel 25 decreases toward the downstream side in the section where the guide portions 28, 38 are arranged inside the single cell 10. Thus, the flow of oxidant gas includes a directional component directed from the side corresponding to the bottom of the gas channel 25 (the flat separator base 21) toward the opening (the membrane electrode assembly 13). Also, the flow velocity of the oxidant gas is increased.

It is possible to form the guide portions 28, 38 to extend to have rectangular cross-sectional shapes in the width direction W or to extend to have arcuate cross-sectional shapes in the width direction W. In short, the guide portions 28, 38 may have any shapes as long as the inner wall surfaces of the gas channels 25, 35 protrude inward of the gas channels 25, 35 such that the cross-sectional areas of the gas channels 25, 35 are partially narrowed.

The functional units, each of which includes a pair of communication passages 27, 37 and one guide portion 28, 38, do not necessarily need to be arranged at equal intervals on the gas channel forming plates 22, 32. For example, a greater number of functional units may be arranged in areas where water is more likely to be generated.

In the gas channel forming plates 22, 32, the guide portions 28 provided in each adjacent pair of the gas channels 25, 35 may be arranged at positions displaced from each other in the extending direction L. Specifically, the guide portions 28 may be arranged as described in [Specific Example 1] and [Specific Example 2], which will be discussed below.

Figure 9:
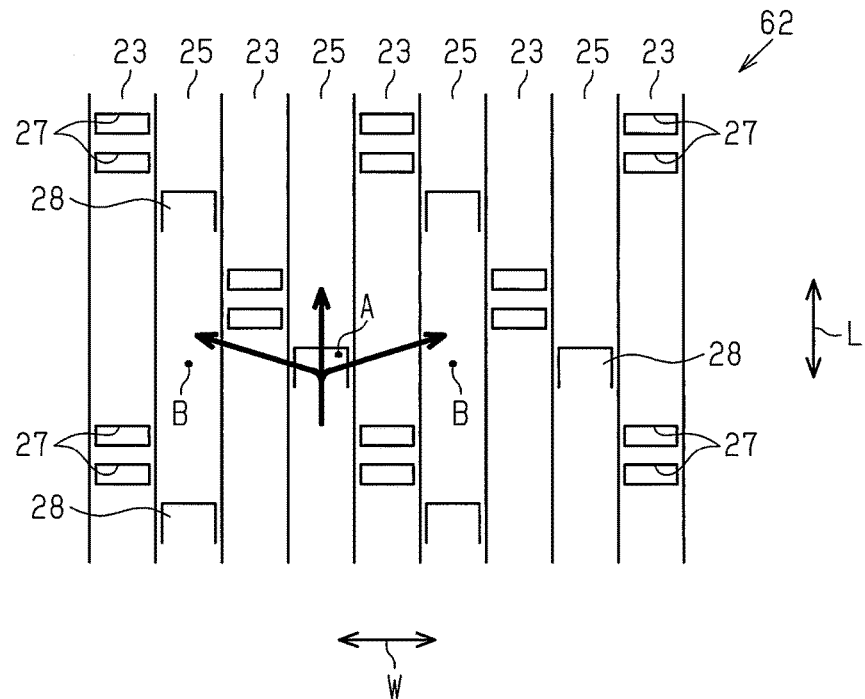
FIG. 9 is a schematic diagram of the planar configuration of a separator according to another embodiment.

FIG. 9 illustrates a gas channel forming plate 62 according to [Specific Example 1], in which each pair of communication passages 27 and the adjacent guide portion 28 constitute a functional unit, and the functional units are arranged at regular intervals in the extending direction L with respect to the gas channels 25, 35. In addition, the functional units are arranged such that the functional unit provided in one of each adjacent pair of the gas channels 25, 35 and the functional unit provided in the other are arranged in a staggered pattern in the extending direction L.

Figure 10:
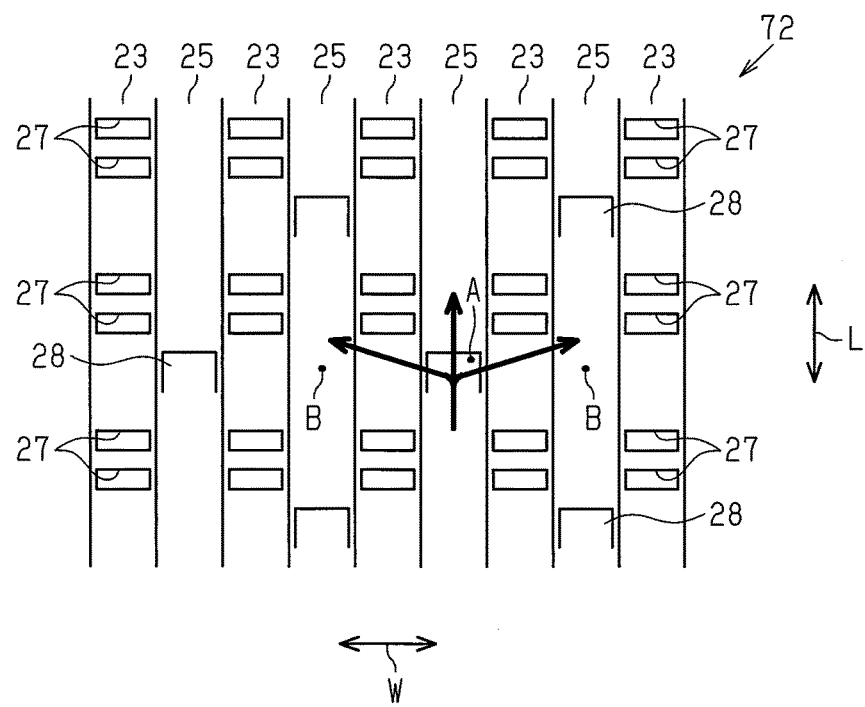
FIG. 10 is a schematic diagram of the planar configuration of a separator according to another embodiment.

FIG. 10 illustrates a gas channel forming plate 72 according to [Specific Example 2], in which multiple pairs of communication passages 27 are arranged at regular intervals in the extending direction L with respect to the gas channels 25, 35. Further, the communication passages 27 provided in adjacent gas channels 25, 35 are aligned on the same straight line extending in the width direction W. Further, in the gas channel forming plate 72, instead of being adjacent to all the pairs of the communication passages 27, the guide portions 28 are arranged to be adjacent to every other pair of the communication passages 27 in both the extending direction L and the width direction W.

The arrangements of the guide portions 28 shown in FIGS. 9 and 10 achieve the following advantages.

In the fuel cell of the above-illustrated embodiment, the protruding ends of the inner protrusions 23, 33 are in contact with the gas diffusion layers 17, 18 (see FIG. 5). Thus, parts of the surfaces of the gas diffusion layers 17, 18 that face the inner protrusions 23, 33 are blocked by the protruding ends of the inner protrusions 23, 33, and gas (fuel gas or oxidant gas) cannot easily enter the gas diffusion layers 17, 18. Such a structure may hinder improvement of the power generation efficiency of the fuel cell.

Reduction in the dimensions of the inner protrusions 23, 33 of the gas channel forming plates 22, 32 (see FIG. 2) in the width direction W narrows the portions on the surfaces of the gas diffusion layers 17, 18 that are blocked by the protruding ends of the inner protrusions 23, 33. However, since the above described fuel cell supports the gas channel forming plates 22, 32 at the contacting portions between the protruding ends of the inner protrusions 23, 33 and the gas diffusion layers 17, 18, there is a limit to shortening the dimensions of the inner protrusions 23, 33 in the width direction W in order to ensure the supporting strength.

In a fuel cell that employs the gas channel forming plates of the modification shown in FIG. 9 or 10, the guide portions 28 each function as a portion that partially reduces the cross-sectional area of the gas channel 25, 35 (that is, as a restriction). Thus, the internal pressure is higher in the gas channels 25, 35 at sections where the guide portions 28 are provided and in the sections upstream of these sections than in the other sections. In the fuel cells of these modifications, the guide portions 28, each of which is provided in each of two gas channels 25, 35 that sandwich one inner protrusion 23, 33, are displaced from each other in the extending direction L.

As a result, of each adjacent pair of the gas channels 25, 35, the guide portion 28 is provided in one of the sections sandwiching one inner protrusion 23, 33 (that is, at the section denoted by A in FIGS. 9 and 10), thereby increasing the internal pressure, and no guide portion 28 is provided in the other (the sections denoted by B), thereby keeping the internal pressure relatively low. In this manner, in the fuel cell of these modifications, a pressure difference can be generated between two gas channels 25, 35 sandwiching one inner protrusion 23, 33.

Therefore, as indicated by the arrows in FIGS. 9 and 10, the pressure difference can be used to cause gas to flow from one of the gas channels 25, 35 to the adjacent ones via sections of the gas diffusion layers 17, 18 that are in contact with the protruding ends of the inner protrusions 23, 33. This allows a great amount of power generating gas to be supplied to the sections of the membrane electrode assembly 13 with which the inner protrusions 23, 33 are in contact, so that the power generation efficiency of the fuel cell is improved.

In the above-illustrated embodiment, the guide portions 28 provided in any adjacent pair of the gas channels 25, 35 are located at the same position in the extending direction L. In this case, the guide portions 28 are arranged in each adjacent pair of the gas channels 25, 35 at sections sandwiching the corresponding inner protrusion 23, 33. This increases the internal pressure so that the above pressure difference as in the modifications is not generated. In addition, the internal pressure of the sections of the gas channels 25, 35 where the guide portions 28 are arranged is higher than that in the other sections. Thus, gas and water tend to stagnate in a section sandwiched by such sections where the guide portions 28 are arranged (more specifically, in the sections of the gas diffusion layers 17, 18 that are in contact with the protruding ends of the inner protrusions 23, 33).

In this respect, in the fuel cell of the modifications, the pressure difference is generated to allow gas to smoothly flow to the sections of the diffusion layers 17, 18 with which the protruding ends of the inner protrusions 23, 33 are in contact. This restrains stagnation of gas and water, thereby improving the power generation efficiency.

In addition, it is possible to employ a separator having both the structure of [Specific Example 1] and the structure of [Specific Example 2]. Specifically, the structure of [Specific Example 1] (see FIG. 9) may be employed in upstream sections of the separator, where water is unlikely to be generated, and the structure of [Specific Example 2] (see FIG. 10) may be employed in downstream sections, where water is likely to be generated.

In the modification of FIG. 9, a functional unit provided in one of each adjacent pair of the gas channels 25, 35 and another functional unit provided in the other are displaced from each other in the extending direction L. The present invention is not limited to this, and the functional units may be aligned diagonally or in a zig-zag manner. Alternatively, some or all of the functional units may be arranged irregularly.

In the gas channel forming plate 72 of the modification of FIG. 10, guide portions 28 are provided to be adjacent to every other pair of the communication passages 27. The present invention is not limited to this, and guide portions 28 may be provided to be adjacent to every third or fourth pair of the communication passages 27. Alternatively, some or all of the guide portions 28 may be arranged irregularly.

Each functional unit may be constituted by three or more communication passages and one guide portion 28, 38 arranged at positions close to each other in the extending direction L.

The gas channel forming plates 22, 32 are not limited to those having corrugated shapes. That is, plates of any shape can be employed as long as the cross-sectional shapes have projections and depressions arranged alternately in the width direction W. For example, it is possible to employ plates having cross-sectional shapes of square waves or sawtooth waves. Further, in the gas channel forming plates 22, 32, the grooves forming the gas channels 25, 35 may have the relationship of skew lines or extend in a meandering manner. Also, the grooves forming the water channels 26, 36 may have the relationship of skew lines or extend in a meandering manner.

The inner protrusions 23, 33 do not necessarily need to extend linearly as a whole in the extending direction L. For example, each of the inner protrusions 23, 33 may be formed such that an upstream section and a downstream section are displaced from each other in the width direction W at one or more positions. In this case, a plurality of pairs of communication passages 27 can be formed in portions of the inner protrusions 23, 33 that are displaced in the width direction W so as to be aligned in the direction in which the inner protrusions 23, 33 extend.

In the illustrated embodiments, the guide portions 28, 38 are formed to have the same shape. However, the shapes of the guide portions 28, 38 can be differentiated according to the positions where the guide portions 28, 38 are arranged in the gas channel forming plates 22, 32.

A gas channel forming plate 22 having guide portions 28 may be provided on the cathode side of the membrane electrode assembly 13, and a gas channel forming plate having no guide portions 38 may be provided on the anode side of the membrane electrode assembly 13. In this case, a gas channel forming plate having no communication passages 37 may be used as the anode-side gas channel forming plate. Alternatively, it is possible to omit the anode-side gas channel forming plate after forming gas channels on the anode side of the membrane electrode assembly 13. Further, a gas channel forming plate having no guide portions 28 may be provided on the cathode side of the membrane electrode assembly 13, and a gas channel forming plate 32 having guide portions 38 may be provided on the anode side of the membrane electrode assembly 13.

The flat plate-shaped separator bases 21, 31 may be replaced by separator bases of any suitable shapes. For example, separator bases with projections and depressions (dimples) or corrugated separator bases may be employed.

The invention claimed is:

1. A gas channel forming plate for a single cell of a fuel cell, the gas channel forming plate being arranged between a membrane electrode assembly and a plate-shaped separator base and comprising:
    a plurality of first grooves arranged at intervals on a surface that faces the membrane electrode assembly, each of the first grooves forming a gas channel;
    a second groove formed on a back side of a protrusion located between an adjacent pair of the gas channels; and
    a plurality of communication passages arranged at intervals in a direction in which the protrusion extends, the communication passages connecting the gas channels and the water channel to each other,
    wherein a bottom surface of each of the first grooves includes a plurality of guide portions protruding inward in a corresponding one of the gas channels such that a cross-sectional area of the gas channel is partially narrowed,
    wherein an edge of each communication passage or an upstream side in a flowing direction of gas flowing in the gas channel is arranged at a position where, in a velocity vector of the gas, a directional component directed from a side corresponding to the membrane electrode assembly toward the separator base has a positive value, and
    wherein each guide portion includes an inclined surface that inclines such that the cross-sectional area of the gas channel is narrowed toward a downstream side in the flowing direction.

2. The gas channel forming plate for a fuel cell according to claim 1, wherein downstream edges in the flowing direction of the guide portions and the upstream edges in the flowing direction of the communication passages are located at same positions in the flowing direction.

3. The gas channel forming plate for a fuel cell according to claim 1, wherein the gas channel forming plate is a plate of which a cross-sectional shape in a direction perpendicular to the direction in which the gas channels extend has projections and depressions.

4. A fuel cell stack that is formed by stacking a plurality of single cells, wherein each single cell includes
    a membrane electrode assembly,
    a plate-shaped separator base, and
    the gas channel forming plate for a fuel cell according to claim 1, wherein the gas channel forming plate is arranged between the membrane electrode assembly and the separator base.

\* \* \* \* \*